C. LE G. FORTESCUE.
CIRCUIT INTERRUPTING SYSTEM.
APPLICATION FILED OCT. 6, 1916.

1,377,573.

Patented May 10, 1921.

WITNESSES:

INVENTOR
Charles Le G. Fortescue.
BY
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

CIRCUIT-INTERRUPTING SYSTEM.

1,377,573.  Specification of Letters Patent.  Patented May 10, 1921.

Application filed October 6, 1916. Serial No. 124,053.

*To all whom it may concern:*

Be it known that I, CHARLES LE G. FORTESCUE, a subject of the King of England, and a resident of Pittsburgh, in the county of Allegheny and State of Pennsylvania, have invented a new and useful Improvement in Circuit-Interrupting Systems, of which the following is a specification.

My invention relates to means for automatically interrupting electric circuits under predetermined conditions.

One object of my invention is to provide an automatic circuit interrupter that shall be adapted to operate in anticipation of disturbances on a circuit with which it is associated to interrupt the same before the current has sufficient time to attain a dangerous or destructive value.

Another object of my invention is to provide a device of the above indicated character that shall operate only when the voltage of the circuit changes at a predetermined rate.

Heretofore, it has been proposed to connect an auxiliary circuit comprising a condenser and a trip coil in shunt relation to an electric circuit for the purpose of tripping an interrupter when the voltage of the electric circuit fluctuates rapidly because of a ground or short circuit thereon. Such a device operates satisfactorily on direct-current distributing circuits, but, because of the double-frequency currents and the fluctuating voltage caused by the armature reaction in the field-winding circuit of an unbalanced alternator, the device will frequently operate incorrectly when used in this connection. In view of this, I provide a parallel-resonant circuit that I connect in series with a condenser and a trip coil. The tuned or parallel-resonant circuit is so proportioned that substantially no current traverses the trip coil under normal conditions, but the condenser has such a periodicity that, when the voltage across the circuit changes rapidly, because of line or other disturbances, sufficient current will traverse the trip coil to trip the interrupter.

My invention is applicable to the field-circuit interrupters of alternators and to alternating-current distributing systems in general.

Figure 1:
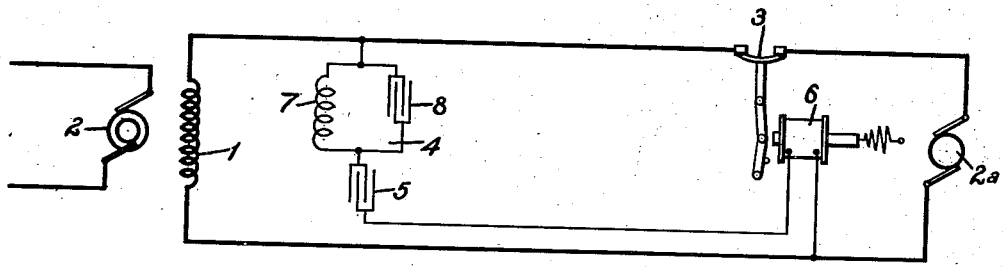
Figure 2:
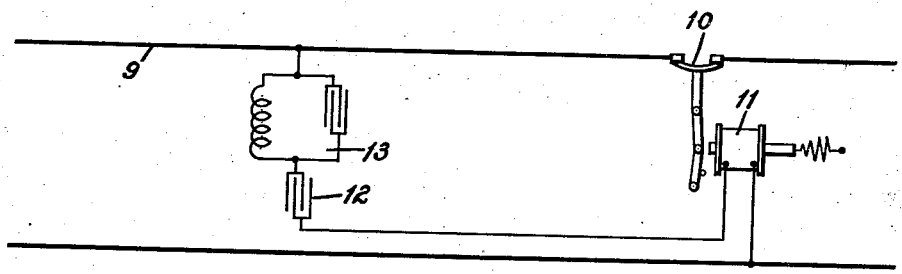

Figure 1 of the accompanying drawings is a diagrammatic illustration of a field-winding circuit of an alternator embodying my invention, and Fig. 2 is a diagrammatic view of an alternating-current distributing circuit embodying my invention.

The field-magnet winding 1 of an alternator 2 is adapted to be supplied with energy from a direct-current generator 2ª and is provided with a circuit interrupter 3 that is adapted to be tripped in anticipation of predetermined conditions in the alternator 2.

A parallel-resonant circuit 4 is connected in series with a condenser 5 and the trip coil 6 of the interrupter 3, and the circuit, thus constituted, is connected in shunt relation to the winding 1. The parallel-resonant circuit 4 comprises a reactor 7 and a condenser 8 so proportioned that the circuit is resonant for the normal double-frequency fluctuations in the winding 1 which are caused by the armature reactions incident to the unbalancing of the phases of the alternator 2. The condenser 5 is so proportioned that it will permit current to flow through the circuit when the voltage across the winding 1 changes rapidly because of disturbances in the armature circuit of the alternator 2 but will not permit direct-current, from the exciter, to flow therein. Thus, under normal conditions, substantially no current will traverse the trip coil 6, as the circuit 4 is resonant at the frequency which is caused by the armature reaction. However, when abnormal conditions obtain in the field-magnet winding 1, that are caused by a ground or short circuit on the alternator 2, the voltage across the winding 1 will change rapidly, thus causing sufficient current to pass through the trip coil 6 to effect the tripping of the interrupter 3 before a destructive voltage is generated by the alternator.

In Fig. 2 of the drawings, an alternating-current circuit 9 is provided with a circuit interrupter 10 having a trip coil 11 that is adapted to be energized when the voltage of the circuit changes suddenly from its normal value in order that the circuit may be interrupted in anticipation of disturbances thereon. The trip coil 11 is connected in series with a circuit comprising a condenser 12 and a parallel-resonant circuit 13. The circuit, thus constituted, is connected in shunt relation to the circuit 9. The parallel-resonant circuit 13 is so tuned that substantially no current traverses the trip coil 11 at the normal frequency of the circuit 9. The condenser is of such periodicity that it will permit current to flow only when there is a rapid change in the voltage across the circuit 9. Thus, when a ground or short circuit obtains upon the circuit 9, the voltage will change quickly causing a rush of current through the condenser and through the coil 11 sufficient to trip the circuit interrupter 10 before the current that traverses the circuit 9 has sufficient time to become destructive.

I do not limit my invention to the particular arrangement illustrated, as it may be variously modified without departing from the spirit and scope of the invention set forth in the appended claims.

I claim as my invention:

1. An interrupter for a main circuit comprising relatively movable contact members, and a trip coil circuit so tuned that substantially no current traverses the trip coil at the normal frequency of the main circuit and an appreciable current traverses the same only upon a predetermined rate of electrical change in the main circuit.

2. A trip coil circuit comprising a parallel-resonant circuit so tuned that substantially no current traverses the same under normal conditions and a condenser adapted to discharge under predetermined conditions.

3. An interrupter for an electric circuit comprising relatively movable contact members, a trip coil, a parallel-resonant circuit and a condenser connected in series with the trip coil.

4. An interrupter for an alternating-current circuit comprising a parallel-resonant circuit tuned to the normal requency of the alternating-current circuit, and a condenser and a trip coil connected in series with the resonant circuit, the circuit, thus constituted, being connected to the alternating-current circuit, the said condenser being of such periodicity that it discharges under predetermined conditions.

5. An interrupter for an alternating-current circuit comprising a parallel-resonant circuit, a trip coil and a condenser connected in series relation with respect to each other and in shunt relation to the alternating-current circuit, said resonant circuit and condenser being so proportioned that an appreciable current traverses the trip coil only when a change in the voltage across the alternating-current exceeds a predetermined rate.

6. An interrupter for a main electric circuit comprising a compound-resonant circuit and a trip coil so related thereto that an appreciable current traverses the trip coil only when a change in the voltage of the main circuit exceeds a predetermined rate.

7. An interrupter for a main electric circuit comprising a compound-resonant circuit connected in shunt relation to the main circuit and dependent upon a predetermined electrical change in the main circuit for actuating the interrupter to open said main circuit.

8. In an interrupting device for a main electric circuit, the combination with a series-parallel-resonant circuit connected in shunt relation to the main circuit, of a trip coil connected in series with the series-parallel-resonant circuit and adapted to trip the interrupting device when the voltage across the main circuit changes under predetermined conditions.

9. An interrupting device for a main electric circuit comprising a series-parallel-resonant circuit connected in shunt relation to the main circuit and a trip coil connected in series with the series-parallel-resonant circuit.

10. The combination with a circuit interrupter for an electric circuit and a trip coil therefor, of means for substantially precluding the energization of the trip coil under conditions of normal frequency, and means for permitting an appreciable current to traverse the same upon the occurrence of a predetermined voltage impulse.

11. The combination with a circuit interrupter and a trip coil therefor, of means connected between the trip coil and the circuit for substantially preventing the energization of the trip coil under normal-frequency conditions in the circuit and for effecting its energization only when the voltage across the circuit changes quickly.

12. In an electric circuit, the combination with a circuit interrupter, of a trip-coil circuit connected to the circuit and so tuned that substantially no current traverses the trip coil at the normal frequency of the main circuit and an appreciable current traverses the same only upon a predetermined rate of electrical change in the main circuit.

13. In a main electric circuit, the combination with an electro-responsive device, of a circuit comprising the electro-responsive device connected to the main circuit and so tuned that substantially no current traverses the device at the normal frequency of the main circuit and an appreciable current traverses the same only upon a predetermined rate of electrical change in the main circuit.

14. In a main electric circuit, the combination with an electro-responsive device, of a circuit comprising the electro-responsive device connected to the main circuit and so tuned that substantially no current traverses the device at the normal frequency of the main circuit and an appreciable current traverses the same only when the voltage on the main circuit changes quickly.

15. The combination with a circuit constituting a parallel-resonant path for alternating-current impulses having a certain frequency, of a second circuit connected in series relationship therewith whereby a series resonant path is established for alternating currents of another frequency.

16. The combination with an alternating-current dynamo-electric machine and a field-magnet winding therefor, of a circuit interrupter for the winding, comprising a resonant circuit tuned to the normal frequency of the alternating-current circuit, and a condenser and a trip coil connected in series with the resonant circuit, the condenser being of such periodicity that it discharges under predetermined conditions.

17. The combination with an alternating-current dynamo-electric machine and a field-magnet winding therefor, of means for controlling the circuit of the field-magnet winding, comprising a resonant circuit tuned to the normal frequency of the alternating-current circuit and a condenser both connected across the field-magnet winding.

In testimony whereof, I have hereunto subscribed my name this 29th day of Sept., 1916.

CHARLES LE G. FORTESCUE.